United States Patent [19]

Kilicaslan et al.

[11] Patent Number: 5,094,673
[45] Date of Patent: Mar. 10, 1992

[54] APPARATUS FOR DEDUSTING A GAS STREAM

[75] Inventors: Muharrem Kilicaslan, Voerde; Hans-Joachim Meier, Alpen; Wolfgang Raue, Duisburg; Heiko Rehwinkel, Bottrop; Gerd Ruther, Essen; Jürgen Rütten, Kempen, all of Fed. Rep. of Germany

[73] Assignee: Deutsche Babcock Anlagen Aktiengesellschaft, Oberhausen, Fed. Rep. of Germany

[21] Appl. No.: 632,373

[22] Filed: Dec. 21, 1990

[30] Foreign Application Priority Data

Dec. 21, 1989 [DE] Fed. Rep. of Germany ... 8914966[U]

[51] Int. Cl.[5] .............................................. B01D 46/00
[52] U.S. Cl. ...................................... 55/302; 55/341.1
[58] Field of Search ................................. 55/302, 341.1

[56] References Cited

U.S. PATENT DOCUMENTS 3,606,736  9/1971  Leliaert .................. 55/302
4,692,176  9/1987  Israelson ................ 55/302

FOREIGN PATENT DOCUMENTS 0129053  2/1988  European Pat. Off. .
1607686  11/1967  Fed. Rep. of Germany .
1757635  4/1972  Fed. Rep. of Germany .
3226952  1/1984  Fed. Rep. of Germany .
3408627  9/1985  Fed. Rep. of Germany .
1564264  3/1969  France .
1095959  6/1984  U.S.S.R. .................. 55/302
1247055  7/1986  U.S.S.R. .................. 55/302
2155354  9/1985  United Kingdom .
2200857  8/1988  United Kingdom .

Primary Examiner—Bernard Nozick
Attorney, Agent, or Firm—Herbert Dubno; Yuri Kateshov

[57] ABSTRACT

An apparatus for removing dust from hot gas under pressure comprises a housing for filter units disposed in cascade between an upper inlet and a dust funnel at a lower part of the housing. Each filter unit comprises a grate array of collecting ducts to which rigid filter candles of porous ceramic tubes are connected. Clean-gas pipes communicate with the ducts and extend within the housing to a clean-gas chamber at which they open through nozzles juxtaposed with drive gas pipes capable of propelling gas through the clean-gas pipes for dislodging deposits of the filter candles.

5 Claims, 7 Drawing Sheets

APPARATUS FOR DEDUSTING A GAS STREAM

FIELD OF THE INVENTION

Our present invention relates to an apparatus for the removal of particulates from a gas stream and especially a hot gas stream under an elevated pressure. More particularly, the invention relates to an apparatus for the removal of dust from a hot gas stream under an elevated pressure utilizing so called candle filters, i.e. relatively rigid tubular filter rods, in a housing and in which clean gas is collected from the interiors of the filter candles.

BACKGROUND OF THE INVENTION

With increasing use of fluidized bed combustion techniques for fossil fuels and in chemical and metallurgical processes, the development of apparatus capable of removing dust from the gaseous reaction products, generally the elevated temperatures and pressures, has been of increasing interest in recent years.

For filtration at temperatures of 500 to 1200° C. and higher, so called candle filters have been developed utilizing filter "candles" or tubes composed of porous ceramic material.

Such filter tubes cannot, at the present time, be fabricated with unlimited lengths or even significant lengths at will. In practice it is found that the longest length of filter tube of such refractory ceramic filters is about 1.50 m. To obtain the requisite filter area, therefore, a large number of filter tubes must be mounted in a housing of a limited footprint so as to occupy a minimum space in the plant. As a consequence, the filter candles must be arrayed in a plurality of stages, one above another.

The present invention is intended to develop the apparatus described in European Patent Document EP-B1-0129053. This apparatus comprises an upright cylindrical housing in which clean gas collecting assemblies are disposed, each of which comprises a circular planar bottom plane and a small annular shell or lateral wall surmounted by a conical roof. Between the lateral shell and the housing wall, a small gap is provided for the downwardly directed gas stream. The filter elements are suspended from the perforated bottom plate. The clean gas collecting assembly is connected with a coaxial clean gas pipe that can pass either through the roof or through the bottom of the housing which may be formed as a dust discharging funnel.

To supply a drive gas for the backflushing of the filter surface and dislodging the solids deposits on the outer surface of the candle-type filter elements, each stage has a horizontal blast pipe extending through the shell portion of the respective clean gas collecting assembly. Each blast pipe is juxtaposed with a group of a multiplicity of filter elements and is provided with downwardly directed nozzles each aligned above a respective filter element.

In this apparatus, the individual filter elements are traversed by the gas stream to be cleaned generally in a cross flow. Upon a cleaning of the filter by the blast from the blast pipe, there is a tendency for dislodged dust, especially of the finer particle size fraction, to be entrained onto the filter element.

This results in a shortening of the operating internal of the filter and an increase in the cleaning time. In many cases the filter element can become irreversibly contaminated with fine particles, thereby reducing the useful life of the filter elements.

During the cleaning of a filter element group, the dislodged dust tends to fall upon the conical roof of the assembly disposed below the unit being cleaned.

If the angle of the roof is not sufficient to cause the dust to pass downwardly directly, additional cleaning devices are required to dislodge the dust from the roof. An alternative, of course, is to increase the angle so that it is at least equal to the friction angle, i.e. the angle at which the dust will slide autogenously from the roof. However, the lengths of the filter elements must fall off in the direction of the housing axis in accordance with the steepness of the roof. This has a detrimental effect on the overall filter area for a housing of a given size.

The long branched pipes utilized for supplying the drive gas under high pressure to the chamber traversed by the hot gas subjects the pipes to thermal stress and, when these pipes are composed of austenitic steel that may have only a limited strength, pressure shocks and the reaction forces at elbows and turns of the pipe can result in damage to it.

In German Patent Document DE-AS 17 57 635, a filter apparatus is described which has a raw gas inlet at an upper part of the housing and a single clean gas collecting unit which is located in a lower part of the housing directly above a dust collecting funnel. It comprises a plurality of parallel collecting ducts forming a kind of grate with intervening spaces. On the upper sides of these collecting ducts, filter hoses are connected which, in turn, are suspended from an upper part of the housing. The individual collecting ducts traverse the housing wall and open into a separate clean gas chamber. Each collecting duct has at its end a nozzle formation into which a drive gas nozzle projects. The ends of the collecting ducts are connected with an external gas pipe.

In this apparatus, the raw gas flows in a vertical direction along the filter hoses. When one group of filter hoses is to be cleaned, the raw gas stream promotes the downward fall of the released dust. The dust passes through the gaps between the collecting ducts into the dust funnel. A gas stream does not flow through these gaps.

The apparatus does not appear to be suitable for the cleaning of hot gas, not only because the use of filter hoses is not amenable to the development of high temperatures, but also because of the arrangement of the collecting ducts. The fact that the collecting ducts pass through the housing walls means that thermal stresses are generated which cannot be readily withstood by the materials of the ducts and wall if high temperatures are used. The flushing with external gas, furthermore, would result in a thermal shock which could only be avoided by heating the external gas to the temperature of the clean gas at additional cost and complexity.

OBJECTS OF THE INVENTION

It is, therefore, the principal object of the present invention to provide an improved apparatus for the removal of dust from a gas stream and especially a hot gas stream under pressure whereby the drawbacks of these earlier systems can be avoided.

Another object of the invention is to provide an improved apparatus for the removal of particulates from a gas stream, especially a hot gas stream, which will have a relatively high filter area for a given volume of the housing, which can be cleaned with great efficiency and which will afford greater useful life of the filter candles, i.e. rigid filter rods Still another object of this invention is to provide a filter for the removal of dust from a hot gas stream which insures that the gas to be cleaned will flow in all stages parallel to the filter elements, both for filtering and drawing backflushing to remove dust from the filter elements, while also allowing the filter area to be increased in a housing of given dimensions.

SUMMARY OF THE INVENTION

These objects and others which will become apparent hereinafter are attained, in accordance with the invention, in an apparatus for removing dust from a gas stream, especially a hot gas stream under pressure which comprises a housing formed with an inlet for raw gas to be cleaned at an upper side of the housing and a funnel-shaped dust outlet (dust funnel) opening at its narrow lower end at a lower part of the housing and having a wide mouth located within the housing. According to the invention, a plurality of filter units are disposed stagewise one above another above this mouth. Each of the filter units comprises a plurality of generally bar-shaped tubular manifold ducts (the collecting ducts) arranged in a grate array with mutual spacing, at least one generally vertical clean-gas pipe communicating with at least one duct of the array for discharging clean gas collected by the duct, and a plurality of vertical elongated rigid tubular filter elements (ceramic filter candles or filter tubes) on each of the ducts and communicating therewith for collecting dust on exteriors of the filter elements while cleaning the gas stream as the gas stream passes from the housing along the filter candles through the filter elements into the ducts.

According to a feature of the invention, the collecting ducts of each grate array are mutually parallel and each of these collecting ducts is connected at at least one of its ends within the housing with a respective one of the clean gas pipes. This permits a structurally simple configuration of the collecting ducts and enables a uniform distribution of the filter elements over the cross section of the housing.

According to another feature of the invention, a multiplicity of separate clean-gas pipes is provided for each of the grate arrays and each of the clean-gas pipes is connected to a respective one of the ducts. Each of the clean-gas pipes has, in addition, an open end communicating within a clean-gas chamber formed in the housing, with respective driving gas pipes extending into the clean-gas chamber and opening into respective open ends of the clean-gas pipes.

This configuration has a special advantage for the flushing of the filter elements. The clean-gas pipes which each communicate with one of the collecting ducts of one or more arrays is utilized for supplying the flushing gas within the housing. This eliminates the need to provide within the housing a pipe network for the drive gas. The drive gas pipes which extend individually through the housing wall can be short and straight, thereby reducing the sensitivity of the drive gas pipes to pressure shocks and like mechanical stresses.

The short and straight drive gas pipe can be fitted with water cooling jackets in a simple manner. Because of the ejector action at the open ends of the clean-gas pipes, a large part of the flushing gas is drawn from the clean gas chamber so that thermal shock is avoided.

According to one embodiment of the invention, the clean-gas pipes of each array are affixed to a common support ring and traverse the common support ring.

The support ring is affixed as a collar to the mouth of the dust funnel and the housing is formed with an inwardly extending support ledge upon which the ring rests. The clean-gas chamber can coaxially surround the funnel shape duct outlet and the drive gas pipes individually pass rectilinearly through the bottom of the housing.

Alternatively, the clean-gas pipe can be common to ducts of both grate arrays and the clean-gas chamber can coaxially surround the inlet which can have a funnel shape, diverging toward the grate arrays. In this case, the drive gas pipes can pass individually and rectilinearly through a top of the housing. The two alternative constructions have the advantage that the units mounted in the housing are self-supporting structural units which can thermally deform in operation independently of the housing and, upon opening of the housing, for example, for inspection or maintenance or repair, can be removable as units.

While the filter elements may be suspended in the housing, in the preferred or best mode embodiments of the invention, the filter elements are upstanding filter candles. This configuration has the advantage that the connection between the filter element and the collecting duct can be simpler and less sensitive to the baking of solids thereon upon operation of the apparatus for the removal of dust from hot gas.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
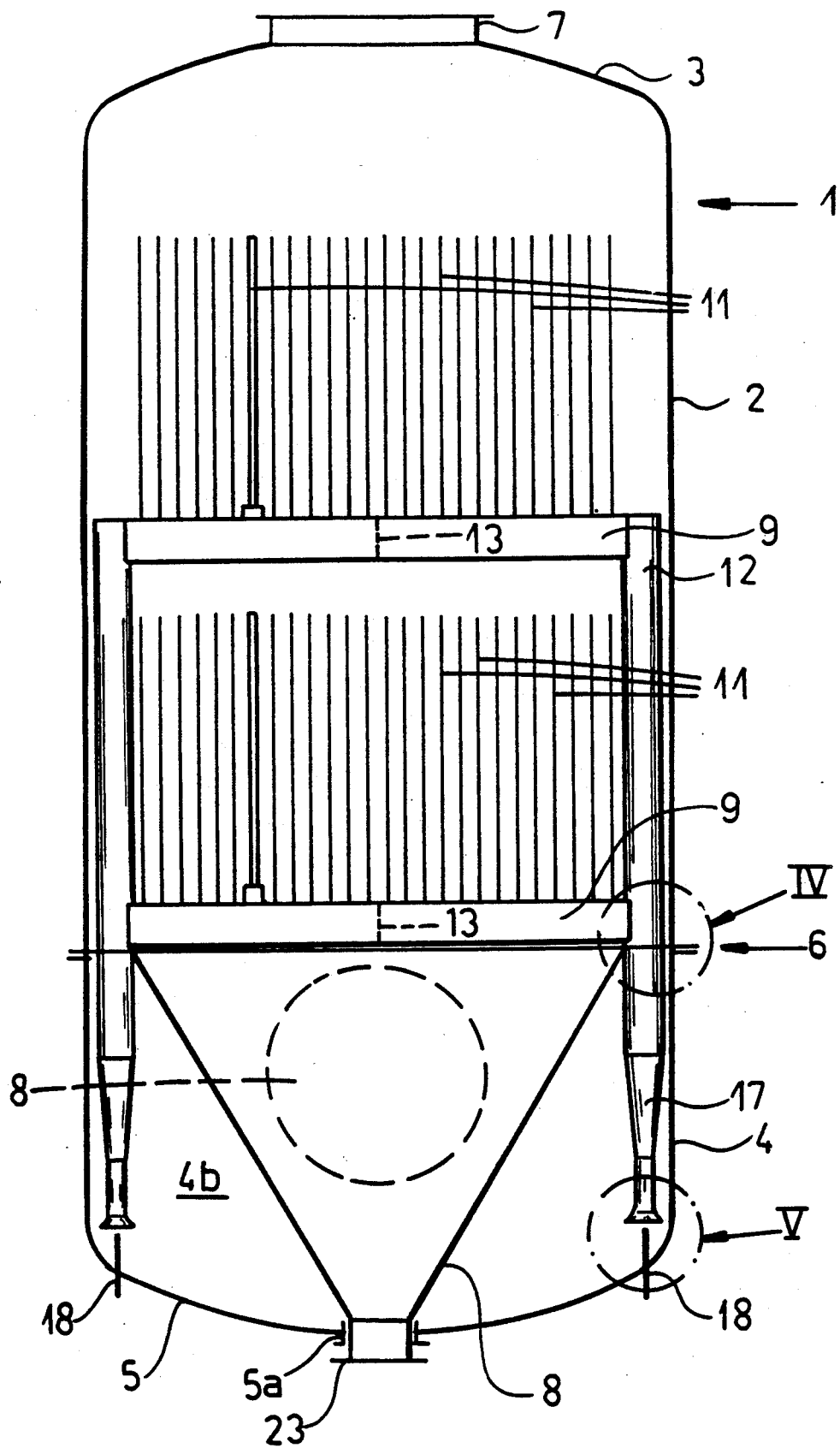
FIG. 1 is a diagrammatic vertical section through one embodiment of a dust collecting filter capable of being operated to clean hot gases at high pressure according to the invention.

In the embodiment of FIGS. 1 through 5, the housing 1 is an upright cylindrical housing comprised of an upper part 2 with a domed roof 3 and a lower part 4 with a domed bottom 5. A flange joint 6 is provided between the upper and lower parts. The roof 3 is formed with an inlet fitting 7 for the raw gas. Laterally on the lower part 4, an outlet fitting 8 for discharging the clean-gas is provided, this outlet fitting being behind the dust funnel 22 in the illustration of FIG. 1.

In the upper part, there are provided in a stagewise manner, i.e. in cascade, two filtering units, each having a clean-gas collecting assembly 9.

Figure 3:
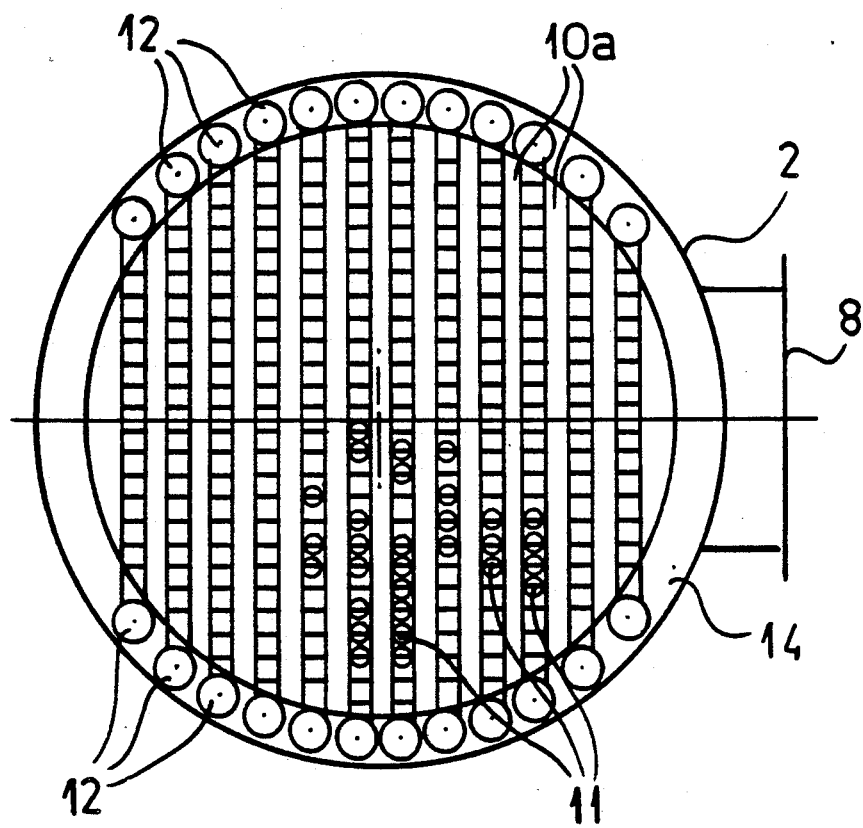
FIG. 3 is a diagrammatic horizontal cross sectional view through the embodiment of FIGS. 1 and 2.

These assemblies are comprised each of a multiplicity of horizontal collecting ducts 10 which define a kind of grate (see FIG. 3) in which the collecting ducts 10 are parallel to one another and lie along chords of the circular housing cross section (FIG. 3).

The collecting ducts 10 are of rectangular cross section and have the long sides of the cross section in vertical planes so that small sides define the upper and lower sides of each collecting duct 10. The side length ratio is about 1:2. The gaps 10a between neighboring collecting ducts have a width which is substantially equal to the width of the collecting ducts 10.

Figure 2:
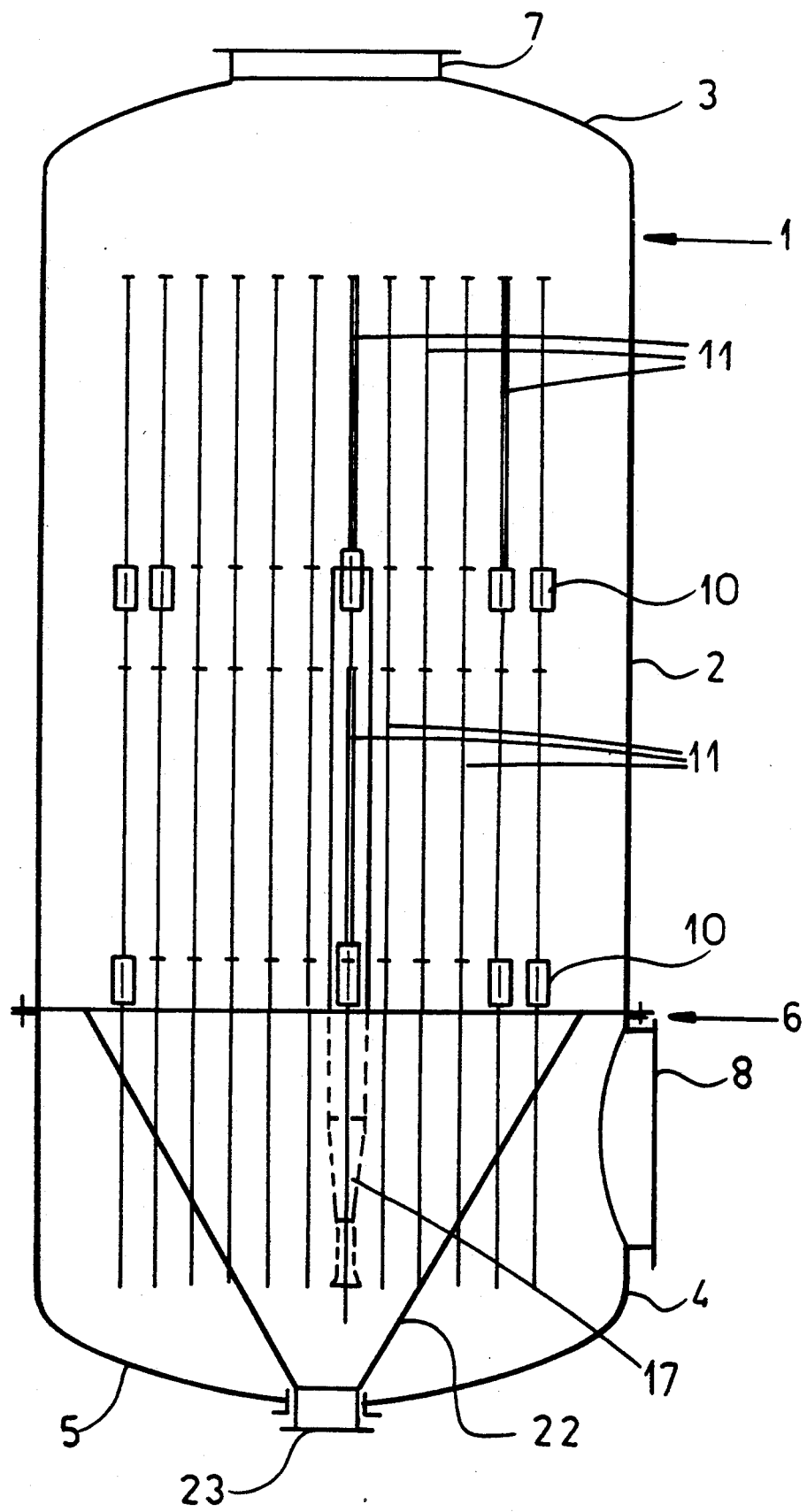
FIG. 2 is a similarly diagrammatic vertical section taken in a plane at right angles to the plane of the section in FIG.

On the upper side of each collecting duct 10, a row of closely adjacent filter candles or rods 11 in an upright configuration is provided. In FIGS. 1 and 2, except for a limited number of the rigid ceramic filter tubes 11 which have been illustrated in elevation, the locations of the filter tubes has been indicated by simple vertical lines. The filter tubes or candles 11 of the lower stage extend substantially to the collecting ducts 10 of the upper stage and the filter candles of the upper stage can extend close to the region of the roof 3 of the filter.

The two ends of each collecting duct 10 are each connected to a respective clean-gas pipe 12. The clean-gas pipe 12 (see FIG. 3) are located at a small distance from the cylindrical housing wall and are provided in two opposing groups. Each clean-gas tube 12 can be connected to a collecting duct 10 of the upper stage as well as to a collecting duct 10 of the lower stage. The clean-gas pipes 12 have, at their communications with the collecting ducts 10, a cutout which has substantially the cross section of the collecting duct 10 so that the interior of the collecting duct 10 opens freely and without constriction into the interior of the clean-gas pipe 12.

Furthermore, each collecting duct 10 in the region of its center is interrupted by a partition 13 so there is no throughgoing connection between the two ends of each collecting duct 10 connected to different clean-gas pipe 12.

Figure 4:
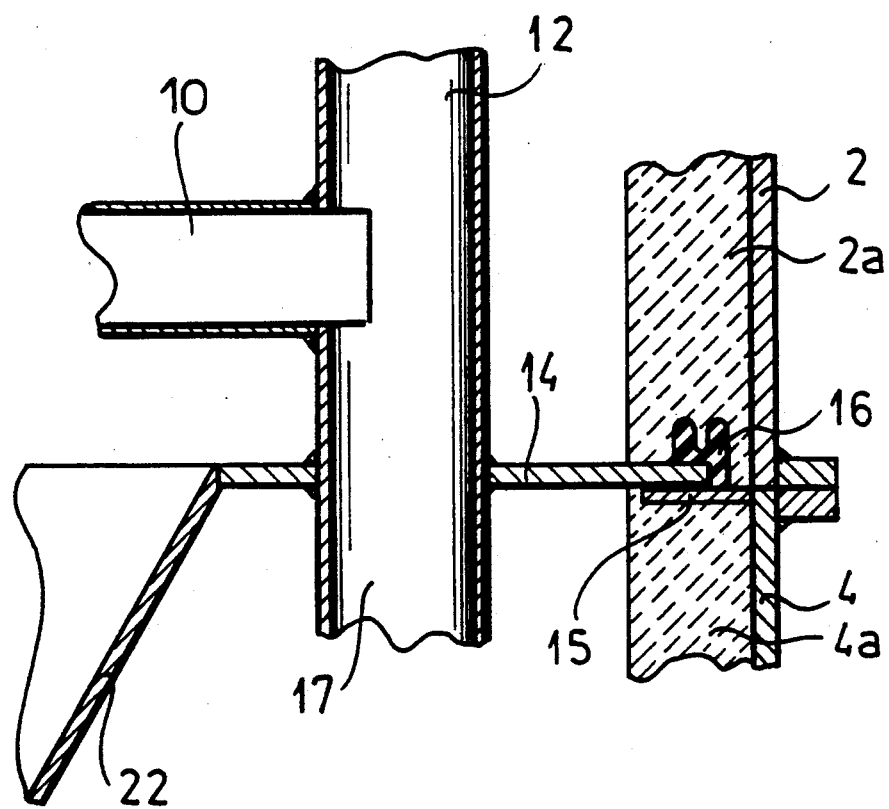
FIG. 4 is a detailed view of the region IV of FIG. 1 and drawn to a larger scale in less diagrammatic form.

As can be seen from FIG. 4, the clean-gas pipes 12 traverse and are welded to a horizontal support ring 14 whose outer margin rests upon an inwardly extending support ledge 15 welded onto the inner wall of the part 4 of the housing. The margin of the support ring 14 is overlain by a seal 16 received in the insulation 2a lining the upper part 2 of the housing. An insulating lining 4a may be provided for the lower part 4 as well. The portion of each clean-gas pipe 12 below the support ring 14 is provided with a nozzle-shape constriction 17 whose open trumpet-shaped widened end 17a (FIGS. 1 and 5) lies close to the bottom 5 of the housing.

Juxtaposed with and opening into the widened end 17a of each clean-gas pipe 12 is a relatively thin drive gas pipe 18 coaxial with the clean-gas pipe. A constricting nozzle 18a at the upper end of the drive gas pipe 18 forms an ejector with the trumpet end 17a drawing gas upwardly from the surrounding as a jet of drive gas is fed up through the clean-gas pipe 17.

Each drive gas pipe 18 is provided with a collar like mounting ring 19 which can be bolted to a flange 20a on a respective tubular fitting 20 welded onto the bottom 5 through which the pipe 18 passes. A sealing sleeve 21 which also serves as thermal insulation seals between the drive gas pipe 18 and the inner wall of the fitting 20.

At the inner edge the support ring 14 is welded to the dust funnel 22 whose outlet fitting 23 is shiftable, i.e. can pass through an opening of the bottom 5 and can be axially displaceable therein and can be closed by a stopper plug or the like. Any conventional axial compensation may be provided between the opening 5a and the bottom 5 and the fitting 23. The shape 4b in the lower part of the housing surrounding the dust flannel 22 forms the clean-gas chamber.

The entire assembly consisting of the support ring 14, the clean-gas pipes 12 with their formation 17, the collecting ducts 10 and the filter candles 11, together with the dust funnel 22, forms a self-supporting removable unit which can thermally deform independently of the housing 1. For maintenance, the upper part 2 of the housing is separated from the lower part 4 at the flange connection 6 and the abovementioned unit can be removed from the housing intact. In operation, the dust-laden raw gas flows through the housing 1 from top to bottom. The local resistance insures a passage of partial streams through the filter candles 11 from the exterior to interior. The dust deposits on the exterior of the candles 11 to form cakes and the clean-gas traverses the interior of the filter candle 11, the connecting ducts 10, the clean-gas pipe 12 and their formations 17, to flow into the clean-gas connecting chamber 4b. At the bottom of the upper stage, residual gas to be cleaned passes through the gaps 10a in the upper grate to the lower filtering stage. In the lower filter stage, the gas again passes through the filter elements 11. To dislodge the dust from the filter element 11, the filter candles are provided with flushing gas pulses in a groupwise manner from the drive gas pipes 18. The collected dust is released and passes downwardly, partly as a result of the weight of the dust and partly by entrainment downwardly by gas passing through the housing from the inlet to the outlet. By contrast with filter systems which use a transverse flow, there is little or no tendency for the finest dust to redeposit on the filter candles and thereby irreversibly contaminate the latter.

To generate the flushing gas pulses, the drive gas pipes 18 can be pressurized in a pulsewise manner with an operating pressure which can be between 1.2 and 5 times that of the gas to be cleaned. This relatively high pressure is transformed at the inlet to the nozzle shaped projection 17 into a reduced under pressure which draws clean hot gas from the cleaning chamber 4b and forces it counter to the normal flow direction of the clean gas as a flushing gas via the collecting ducts into the respective filter candles. It is advantageous that the high pressure gas flows only through short straight drive gas pipes 18.

Figure 6:
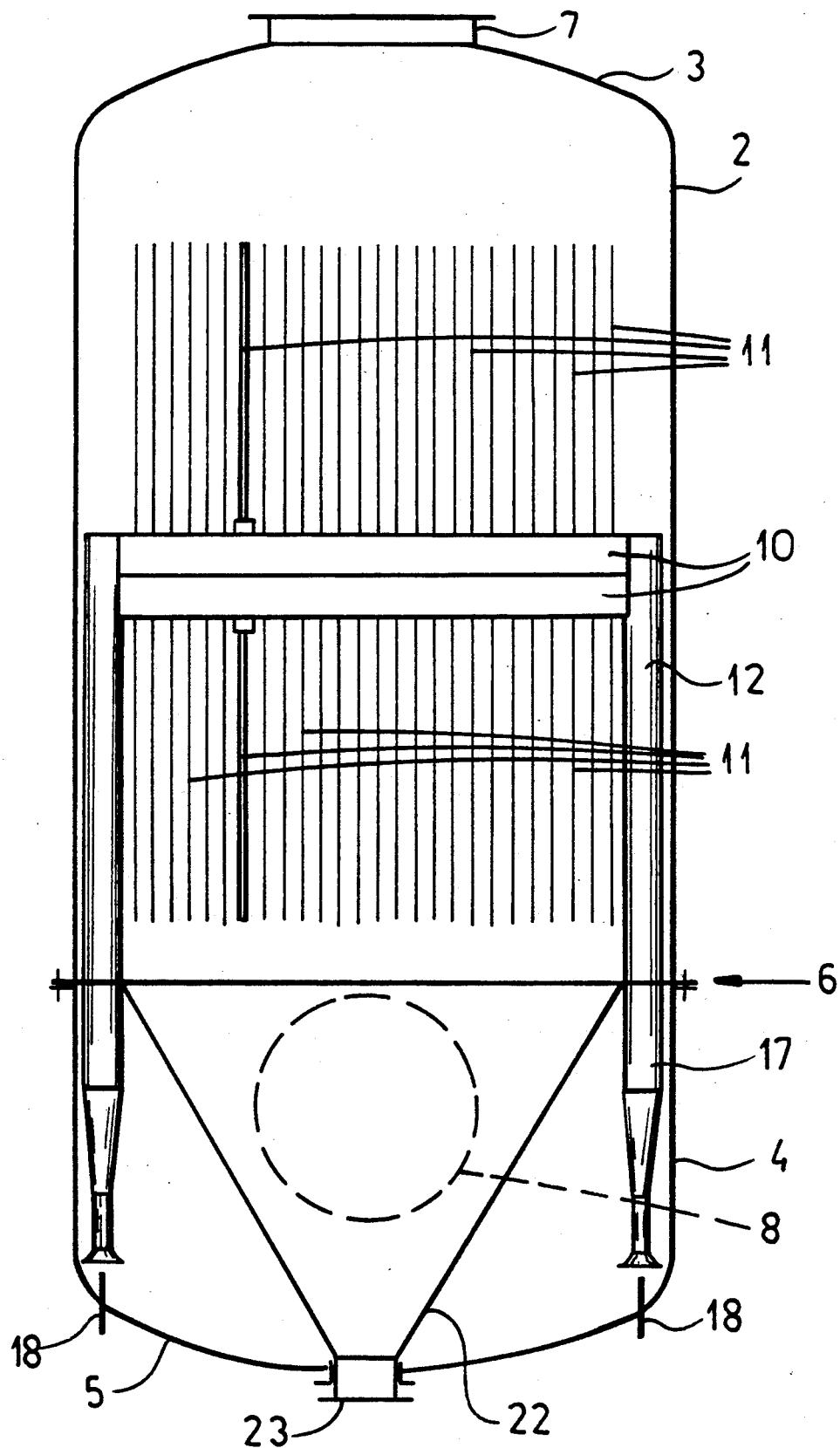
FIG. 6 is a cross sectional view similar to FIG. 1 illustrating another embodiment of the invention.

The embodiment of FIG. 6 differs from that which has been described only in that the collecting ducts 10 of the lower grate are provided directly adjacent the collecting ducts of the upper grate so that the filter tubes 11 of the lower stage depend from their respective collecting duct.

Figure 7:
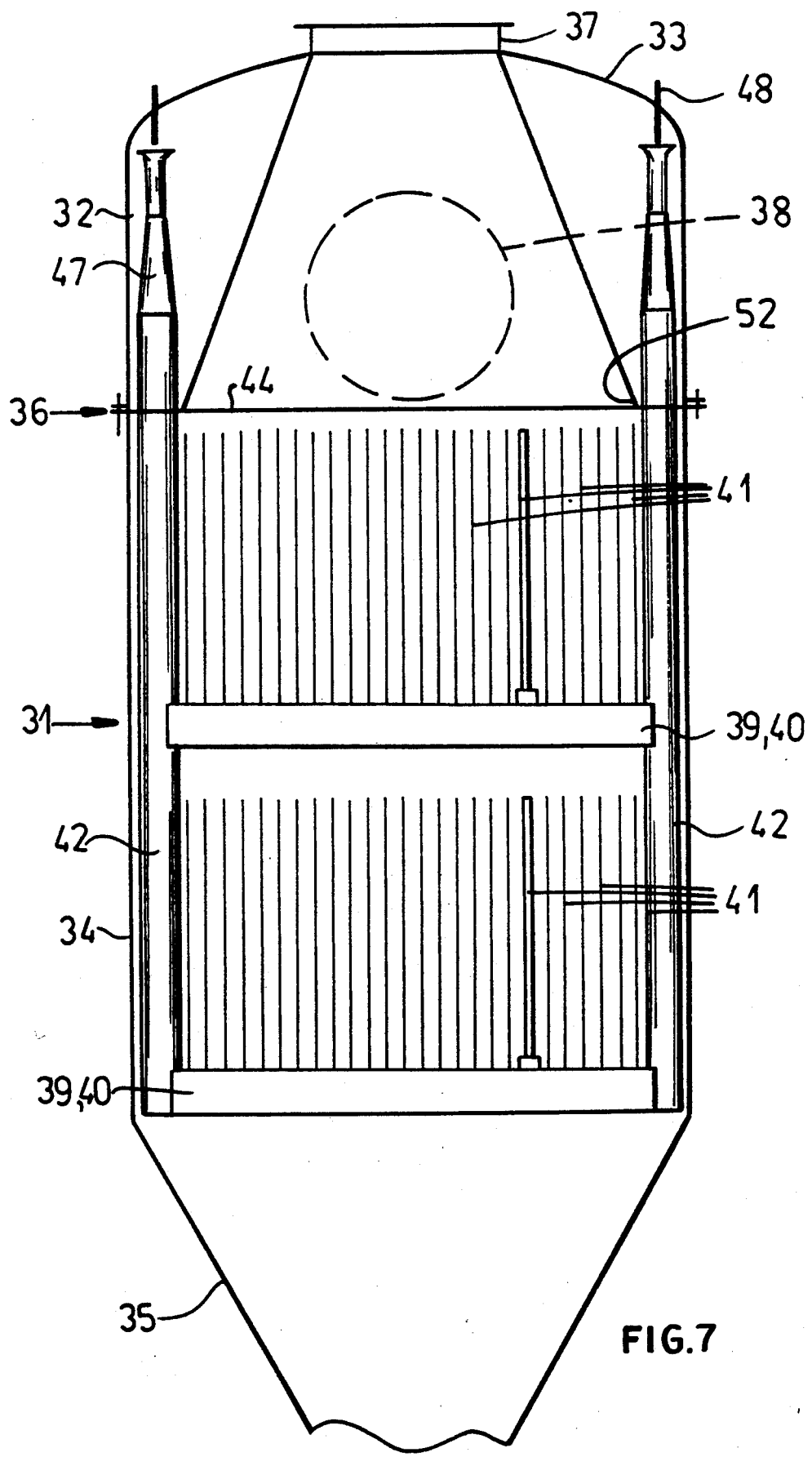
FIG. 7 is another view similar to FIG. 1 showing still another embodiment of this invention.

In the embodiment of FIG. 7 the cylindrical housing 31 has an upper part 32 with a top 33 and a lower part 34 to which the dust funnel 35 is connected. Between the upper part 32 and the lower part 34 a flange connection 36 is provided. The top 33 is traversed by a funnel-shaped inlet fitting 37 for the raw gas, this fitting widening downwardly. An outlet fitting 38 for the clean gas is provided laterally on the upper part 32.

Two clean gas collecting units 39 are provided one above another in the lower part 34 in a manner analogous to the arrangement of the units 9 described for the first embodiment. The units comprise collecting ducts 40 with rigid filter tubes 41 mounted thereon and upstanding from the collecting ducts 40. The collecting ducts 40 are connected, in turn, to the vertical clean-gas pipes 42.

The clean-gas pipes 42 traverse, as has been described for the initial embodiment, a support ring 44 to which the clean gas pipes are welded. The support ring 44 rests upon a ledge or other supports on the wall of the lower part 34. The significant difference between the first embodiment and this embodiment is that the entire filter unit is supported on the support ring 44 and is disposed in the lower part 34 of the housing whose height must be correspondingly dimensioned.

Above the support ring 44, the clean-gas pipe each have a nozzle-like constricted formation 47 whose open trumpet-shaped widening end terminates close to the top 33 of the housing.

Figure 5:
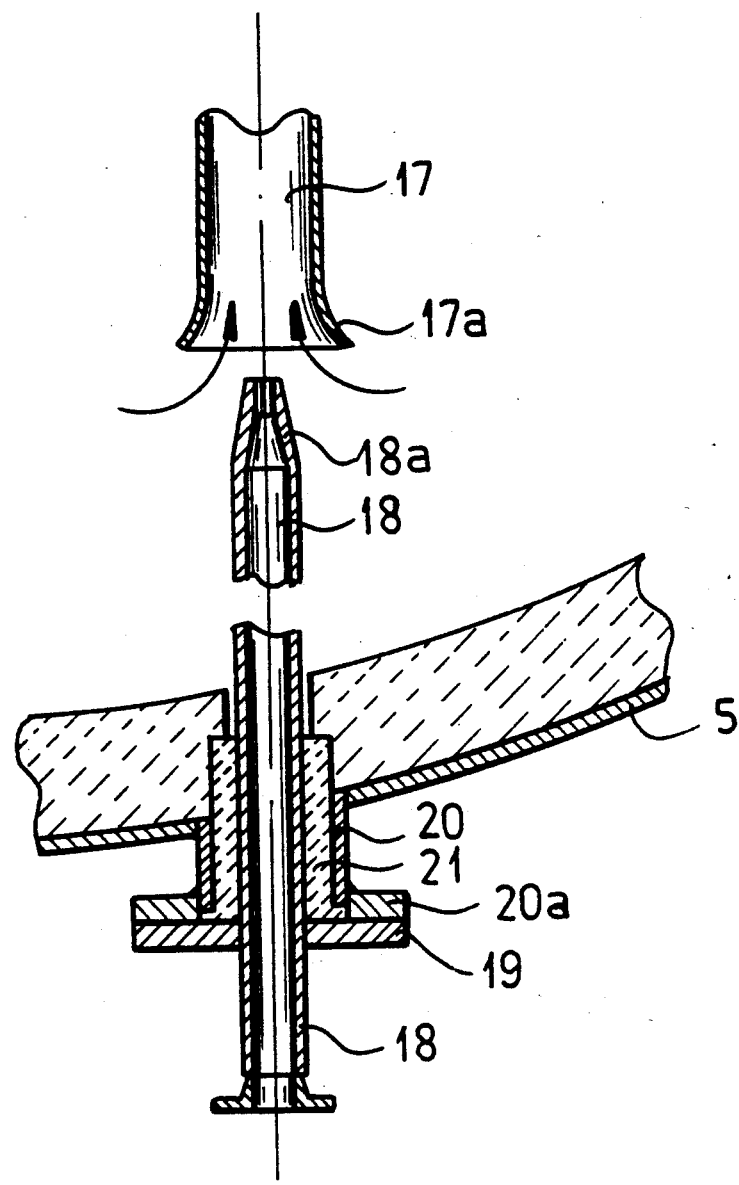
FIG. 5 is a detailed view of the region V of FIG. 1 in less diagrammatic form and drawn to a larger scale.

Analogously to FIG. 5, each clean-gas pipe 42 is juxtaposed with a drive gas pipe 48 passing through the cover 33. At the inner margin of the support ring 44 a mouth 52 of a funnel forming the mouth 52 of the funnel forming the intake fitting 37 is welded. The space surrounding the intake funnel 37 here constitutes the clean-gas chamber.

The embodiment of FIG. 7 operates generally similarly to the embodiment of FIGS. 1 and 2 except that the clean-gas collected in the clean-gas pipe 12 is discharged into the clean-gas chamber at the upper end of the housing rather than the lower end thereof.

For the sake of simplicity, only two stages have been illustrated in excess of the embodiments described. In practice, however, more than two stages will be used in most cases or would be advantageous. The housing need not be of circular cross section as shown but can be of rectangular or other polygonal cross section. Such shapes can be used under atmospheric pressure conditions. For dedusting under elevated pressures, however, the cylindrical and possibly even a spherical configuration is preferred.

I claim:

1. An apparatus for removing dust from a gas stream, comprising:
   a housing formed with an inlet for raw gas to be cleaned at an upper part of said housing;
   a funnel-shaped dust outlet opening at a narrow lower end at a lower part of said housing and having a wide mouth located within said housing;
   a plurality of filter units disposed stagewise one above another above said mouth, each of said filter units comprising:
   a plurality of generally bar-shaped tubular manifold ducts arranged horizontally parallel to one another with mutual spacing in a respective array in each filter unit,
   generally vertical clean-gas pipes communicating with manifold ducts of said arrays for discharging clean-gas communicated by said ducts, and
   a plurality of vertical elongated tubular rigid filter elements on each of said ducts and communicating therewith for collecting dust on exteriors of said filter elements while cleaning said gas stream as said gas stream passes from said housing through said filter elements into said ducts, each of said elements being closed at one end and communicating with a respective one of said ducts at an opposite end; and
   a clean-gas outlet communicating with said clean-gas pipes.

2. The apparatus as defined in claim 1 wherein a multiplicity of separate clean-gas pipes is provided for each of said arrays and each of said clean-gas pipes is connected to a respective one of said ducts, each of said clean-gas pipes having an open end communicating within a clean-gas chamber formed in said housing with a drive gas pipe, said drive gas pipes opening into respective open ends of said clean-gas pipes in said clean-gas chamber.

3. The apparatus as defined in claim 2 wherein said clean-gas pipes of each array are affixed to a common support ring, said support ring being fixed as a collar to said mouth of said funnel shaped dust outlet, said housing being formed with an inwardly extending supporting ledge on a wall thereof, said support ring resting on said ledge, said edges chamber coaxially surrounding said funnel shaped dust outlet, said drive gas pipes independently passing straight through a bottom of said housing.

4. The apparatus as defined in claim 2 wherein said clean-gas pipes are common to ducts of both of said arrays, said clean-gas pipes are all affixed to a common support ring, said support ring being affixed as a collar to a mouth of said inlet, said housing being formed with an inwardly extending support edge of a wall thereof, said support ring resting on said ledge, said clean-gas chamber coaxially surrounding said inlet, said inlet having a funnel shape and diverging toward said matter, said drive gas pipe independently passing through a top of said funnel.

5. The apparatus defined in claim 1 wherein said filter elements are filter candles supported at their bottoms on the respective ducts

* * * * *